(12) United States Patent  
Miyamoto et al.

(10) Patent No.: US 8,312,268 B2  
(45) Date of Patent: Nov. 13, 2012

(54) VIRTUAL MACHINE

(75) Inventors: Takashi Miyamoto, Tokyo (JP);
Kohsuke Okamoto, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 12/333,436

(22) Filed: Dec. 12, 2008

(65) Prior Publication Data

US 2010/0154042 A1    Jun. 17, 2010

(51) Int. Cl.
*G06F 21/00* (2006.01)
(52) U.S. Cl. ............................ 713/166; 713/167; 726/17
(58) Field of Classification Search ................ 726/4, 17, 726/21; 713/166, 167; 718/104; 711/147–153
See application file for complete search history.

(56) References Cited

U.S. PATENT DOCUMENTS

| 7,007,091 | B2 | 2/2006 | Inada et al. | |
| 7,028,298 | B1 | 4/2006 | Foote | |
| 2005/0262493 | A1* | 11/2005 | Schmidt et al. | 717/164 |
| 2007/0180493 | A1* | 8/2007 | Croft et al. | 726/2 |
| 2007/0266426 | A1* | 11/2007 | Iyengar et al. | 726/5 |
| 2009/0031402 | A1* | 1/2009 | Jung et al. | 726/4 |

\* cited by examiner

*Primary Examiner* — Gilberto Barron, Jr.
*Assistant Examiner* — Virginia T Ho
(74) *Attorney, Agent, or Firm* — George R. McGuire; David B. Woycechowsky; Bond Schoeneck & King

(57) ABSTRACT

The present invention is directed to various systems and/or methods relating to a software platform that provides for authentication of a requestor. Preferably, this authentication happens before there is an opportunity for any resource intensive request to harm operation of the system. Preferably, a reliability level is based on authentication so that the amount and/or type of resource access is controlled based, at least in part, on the authentication information. Preferably, heap usage is controlled by this reliability level. Preferably, the software platform is a virtual machine, preferably the Java Virtual Machine.

2 Claims, 2 Drawing Sheets

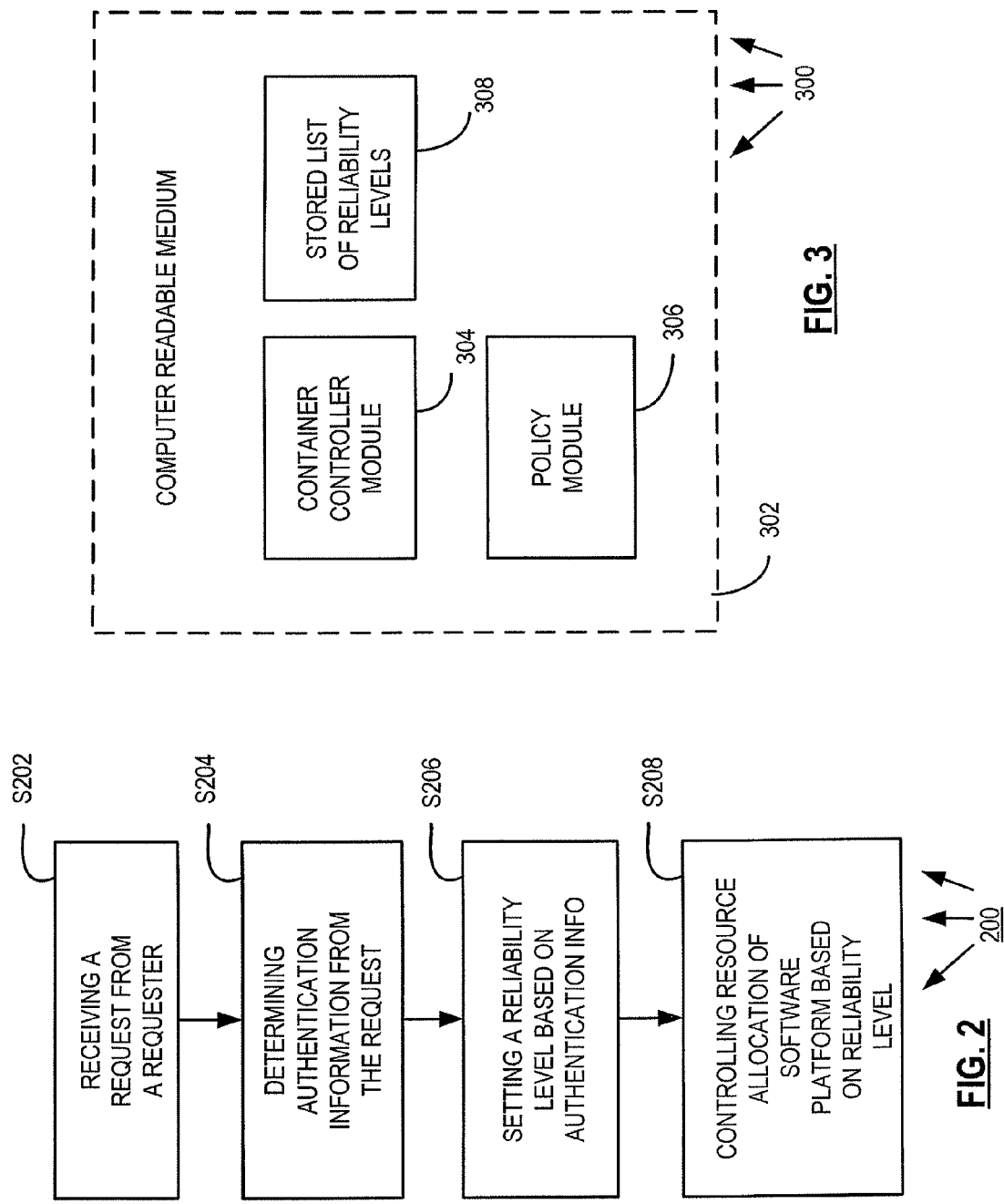

VIRTUAL MACHINE

BACKGROUND

1. Field of the Invention

The present invention relates to authentication methods, to virtual machines and more particularly to the use of resources by virtual machines.

2. Description of the Related Art

Web applications are conventional. A web application is an application that is accessed via a web browser over a network such as the Internet or an intranet. It is also a computer software application that is coded in a browser-supported language, such as HTML, JavaScript, Java, or the like and reliant on a common web browser to make the application executable or to execute it.

Web services are also conventional. A web service is a software system designed to support interoperable machine-to-machine interaction over a network. Web services may take the form of an application programming interface (API) that can be accessed over a network, such as the Internet, and executed on a remote system hosting the requested services. Many web services are implemented by client computers and server computers that communicate using XML messages according to the SOAP protocol. In some preferred web services systems, there is a machine-readable description of the operations offered by the service. For example, this machine readable description may be written in the Web Services Description Language (WSDL). Web services can be written according to alternative styles including: (i) Remote Procedure Calls; (ii) Service Oriented Architecture; and (iii) Representational State Transfer. Service Oriented Architecture (SOA) is currently preferred. Other web applications are being replaced or supplanted by web services, and especially SOA style web services.

In at least some web services systems, a URL is accessed over a network by the web service without going through a top page. For example, the identity of the URL may be disclosed by Universal Description, Discovery and Integration (UDDI). UDDI is a platform-independent, XML-based registry for businesses worldwide to be listed on the Internet. Unlike web applications, web services may allow access without authentication. Also, the XML typical of web services can express very complex contents within a particular structure, such that a great deal of computer resources are required to parse the data. These resource intensive XML documents may even be small in size, even though they require a lot of resources to be parsed. Sometimes these resource intensive XMLs are sent with the intent to cause damage or harm be consuming system resources to the extent that service from a server is considerably slowed or stopped. This is called a denial of service (DoS) attack. Some DoS attacks are referred to as expanding entity attacks.

There are conventional methods for authenticating XML documents. One method is called WS-Security. These conventional XML authentication methods use information contained within the XML document itself, such as a SAML token. However, because the authentication information is in the XML document, it is not obtained until the XML document is at least partially processed.

Virtual machines are conventional. A virtual machine (VM) is a software implementation of a machine (that is, a computer) that executes programs like a real machine. For example, the Java Virtual Machine (JVM) is a VM that executes programs written in the Java language. In some web servers (herein called "normal web servers"), each request is processed by its own thread. These threads are mechanisms that allow parallel processing to occur. However, in other web servers (herein called "heap web servers") there is a heap area (or simply "heap") that is common to all threads. This heap is a memory area shared by all threads that is used when newly creating an object. Heap web servers are implemented in some VM web servers. Specifically and importantly, while a single JVM can operate multiple threads, the JVM web server is a heap web server, which means that all threads of the JVM share its heap area. Some virtual machines, such as JVM, include a function to change CPU priority for each thread, but this protection does not apply to the heap.

Resource intensive XML documents and/or the use of heap areas can lead to many potential problems. It is dangerous to provide memory and/or CPU time for an unreliable request. One potential problem is shutdown of an entire service due to an out of memory condition. One conventional technique for dealing with the foregoing potential problems is memory management for each thread, but this technique has not been, and may never be, widely adopted. For example, the JVM does not include memory management for each thread.

Garbage collection (GC) is conventional. GC is a form of automatic memory management. The garbage collector, or just collector, attempts to reclaim garbage, or memory used by objects that will never be accessed or mutated again by the application. Garbage collection has been used to solve the problems of manual memory management.

U.S. Pat. No. 7,007,091 ("Inada") discloses a system where a subject name of a personal certificate is used for access control. In the Inada system, an authentication unit performs an authentication procedure between a client terminal and a web server. The authentication unit receives a certificate from the client terminal for executing the authentication procedure, and its subject name is supplied to extract a predetermined extracted element. An access right for accessing a document is determined based on the extracted element. A relation between the session number and the determined access right is registered. Thereafter, while the session continues, an access right is allowed based on the session number.

U.S. Pat. No. 7,028,298 ("Foote") discloses a method for managing resource usage of a particular resource by a set of related code, such as code executed on behalf of a downloaded applet. A resource indicator is associated with the related code, and the resource indicator indicates an amount of resource usage of the particular resource by the related code. The resource indicator is updated when the related code changes in its collective resource usage of the particular resource. This is a method of performing memory management for each thread. The Foote system is not easily applicable to heap web servers and/or other heap-based architectures because one characteristic of threads is that memory can be shared between threads, it is difficult to completely identify a thread owned by an object in the heap.

Description Of the Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

SUMMARY

The present invention is directed to various systems and/or methods relating to a software platform (see DEFINITIONS section) that provides for determination of authentication information (see DEFINITIONS section) of a requester (see DEFINITIONS section). Preferably, this authentication happens before there is an opportunity for any resource intensive request (see DEFINITIONS section) to harm operation of the system. Preferably, a reliability level (see DEFINITIONS section) is based on authentication so that the amount and/or type of resource access is controlled based, at least in part, on the authentication information. Preferably, heap usage is controlled by this reliability level. Preferably, the software platform is a VM, preferably JVM.

Various embodiments of the present invention may exhibit one or more of the following objects, features and/or advantages:

(i) prevent harm caused by resource intensive requests, such as resource intensive XML documents
(ii) prevent harm caused by malicious requesters;
(iii) prevent harm caused by DoS, expanding entity and/or other attacks;
(iv) prevent server shutdown;
(v) prevent out of memory condition in a server;
(vi) eliminates certain limitations of methods that involve performing memory management for each thread, such as the need to strictly identify thread owned by each object;
(vii) does not strictly control the used amount of heap of each thread;
(viii) defensive actions can be taken on the mere likelihood of an attack, rather than waiting for an actual attack to materialize; and/or
(ix) troublesome XML documents can be stopped before they are (even partially) processed.

According to one aspect of the present invention, a method of using a software platform includes a receiving step, a determining step, a setting step and a controlling step. The receiving step involves receiving a request from a requester. The determining step involves determining authentication information in the received request the setting step involves setting a reliability level from among a plurality of reliability levels based on the authentication information determined in the determining step. The controlling step is performed after the setting step the controlling step involves controlling a resource allocation allowed in a response to the request by the software platform based on the reliability level set at the setting step.

According to a further aspect of the present invention, a software platform system includes a first resource, a container controller module and a policy module. The container controller module is structured and/or programmed to receive a request from a requester and to determine authentication information in the request. The policy module is structured and/or programmed to set a reliability level from among a plurality of reliability levels based on the authentication information. The container controller module is further structured and/or programmed to at least partially control resource allocation of the first resource in a response to the request by the software platform based on the reliability level.

According to a further aspect of the present invention, a computer readable medium, for use with a first resource, includes a container controller module and a policy module. The container controller module is structured and/or programmed to receive a request from a requester and to determine authentication information in the request. The policy module is structured and/or programmed to set a reliability level from among a plurality of reliability levels based on the authentication information. The container controller module is further structured and/or programmed to at least partially control resource allocation of the first resource in a response to the request by the software platform based on the reliability level.

BRIEF DESCRIPTION OF THE SEVERAL VIEWS OF THE DRAWINGS

The present invention will be more fully understood and appreciated by reading the following Detailed Description in conjunction with the accompanying drawings, in which:

FIG. 2 shows a flowchart of an embodiment of a method according to the present invention; and FIG. 3 shows an embodiment of a computer readable medium according to the present invention.

DETAILED DESCRIPTION

Figure 1:
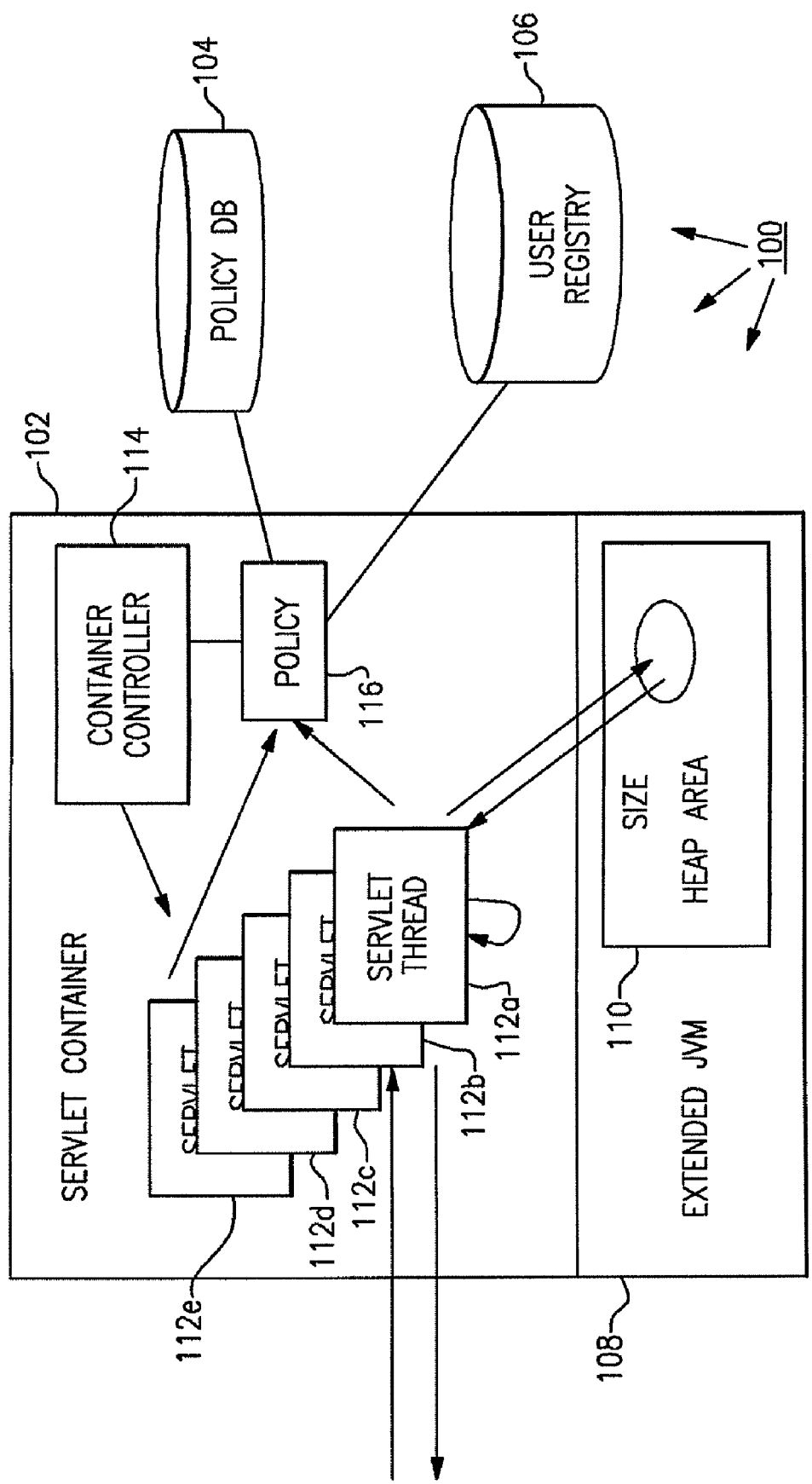
FIG. 1 is a schematic of a system according to the present invention.

According to the present invention, systems and/or associated methods detect when a particular thread is likely to consume a large amount of heap. When the likelihood of large heap consumption is detected, the thread creates an exception at the time of execution and further heap consumption by the thread is suppressed. One way to detect the likelihood of large heap consumption is based upon authentication information associated with a requestor. For example, when a particular requestor is known to have made resource intensive requests, or other attacks, then that requestor may be added to a blacklist.

Then when a webserver later identifies a potentially troublesome requester, based on authentication information, defensive actions are taken. The defensive actions may include: (i) reject all processing requested by requestor; (ii) pass request to a dedicated processing to prepare for a possible attack; and/or (iii) to process the request using only limited resources. Potentially troublesome requestors may be identified by presence on the above-mentioned blacklist or by failure of the authenticated to appear on a whitelist of users that have been verified in some manner to be trustworthy.

Preferably, the systems and methods of the present invention are implemented by a VM, but it is not necessarily so limited and the present invention may be extended to real machines and/or interpreters (real or virtual) provided with a memory management mechanism such as parallel processing or thread and heap and infrastructure software like that found in an operating system (OS). The present invention is also not necessarily limited to web servers, but may be applied to other types of systems such as messaging. Also, the authentication aspects of the present invention are not necessarily limited to identifying requestors who are likely to make a resource intensive request, or other attack, and it may be applicable to requestors deemed undesirable for other reasons.

One preferred embodiment of a method according to the present invention will now be discussed. In this preferred embodiment, a conventional JVM is modified to perform the methods and create the systems of the present invention. It is noted that other types of embodiments are possible, such as methods and systems achieved by rewriting bytecode.

In the preferred embodiment of a modified JVM, the behavior at the time of preparing a JVM object is changed and the behavior of a thread object of a standard library is changed. Some possible changes in behaviors when preparing objects are: (i) when creating an object in a heap area, an owner thread ID is recorded showing which thread has prepared the area; (ii) an obtained memory size is added to the memory counter of the corresponding thread; and (iii) when releasing the heap by a GC, the memory size is deleted from the memory counter of the corresponding thread. Some possible changes to the behavior of a thread object of a standard library are: (i) a memory counter (see above) adds up the amount of memory that the thread obtains in the heap to a normal thread object; (ii) an upper limit is established for the memory counter; and (iii) a function is added to throw an exception when the value of the memory counter reaches the upper limit. This exception is thrown at the time of execution and may be called, for example, ThreadMemoryLimitExceededException.

The use of a servlet container in connection with the present invention will now be discussed. When the above-mentioned exception, at the time of execution, occurs in a thread in which request processing is performed, it becomes possible to process only that request as an error in the server, such as a 500 Internal Server Error. This type of processing avoids an outcome where the entire server shuts down. A requestor's identification information (such as, user authentication information, IP address) is used in processing of the requestor's request. For a request having low reliability (for example, a non-authenticated request), the upper limit (see above) is set to a relatively low value when analyzing the XML associated with the requestor's request. In this way, requestors that are flagged through the authentication process as having low reliability are still allowed some level of interactivity, but are still prevented for doing harm through a resource intensive request. When reusing the thread, the following are performed for each request by the reuse unit: (i) ID is changed each time; (ii) the memory counter is cleared.

Some exemplary details of a thread object according to the present invention will now be discussed. The detail of addition of attribute preferably involves: (i) long heapSizeTotal; and (ii) long maxHeapSizeTotal. Long heapSizeTotal is the total amount of memory which the corresponding thread has secured for the object in the heap. Long maxHeapSizeTotal is the maximum value of memory with which this thread can secure for the object in the heap. Long maxHeapSizeTotal is preferably unlimited when 0 or negative (the same behavior as the current thread). A method getter/setter preferably added to the added attribute.

Another detail of a thread object is called thread contractor. In accordance with thread contractor, the maxHeapSizeTotal is passed by an argument and made to be settable. The amount of the heapSizeTotal is set to 0 at the time of contract. Alternatively, the size of the thread object itself can be set.

Another detail of the thread object is in the change of JVM behavior. Each time the heap is secured in the memory when an object is created in the thread, a memory amount is added to the heapSizeTotal of the thread. When on going sum of heapSizeTotal becomes greater than maxHeapSizeTotal, an exception at the time of execution is thrown (for example, ThreadMemoryLimitExceededException).

Some details of the object will now be discussed. One such detail of the object is the addition of attribute. Thread createdThread is a reference to the thread in which the object is secured in the heap. Another such detail is addition of method, where the getter method is added to the above-mentioned attribute. Another such detail is JVM behavior which may is preferably changed in several ways as will now be explained. When an object is prepared in the heap, reference to the created thread is set at createdThread. An object size is added to the heapSizeTotal of the thread to which createdThread corresponds (when the sum exceeds maxHeapSizeTotal processing proceeds as explained above). When the object is subjected to GC, if the thread corresponding to createdThread still exists, object size is subtracted from the heapSizeTotal of the thread.

A method of obtaining requesters' identification information according to the present invention will now be discussed. By using an IP address, basic authentication and SSL client authentication, it is possible to perform identification without parsing any XML included in the request (that is, it is possible at a protocol level). This is different and better than methods where identification information (such as a SAML token) is included in the XML message, because under those conventional methods identification information cannot be retrieved without parsing the XML. However, when only taking out identification information by interpreting an outermost message envelop, identification information seems to be obtainable using limited memory or without using XML parser for a general-purpose. It is also possible that at first a memory upper limit of the thread is limited and parsed, and after obtaining effective identification information, the memory upper limit is released.

A servlet container for use in systems and methods according to the present invention will now be discussed. In general, a servlet container allocates a pooled thread for each request and processes the request. Therefore, at the time of starting each thread, they can be prepared by setting a heap maximum for each Thread. By defining a heap upper limit for each thread unit, a large amount of heap consumption can be prevented in the exception at the time of execution before the entire heap is consumed by a particular thread. This avoids the outcome where the JVM is shut down for being out of memory.

A servlet container can change a heap maximum, CPU allocation, and request processing priority using credit information based on authentication information before actually processing requests made by the requester associated with the authentication information. For example, the authentication information may be obtainable by HttpServletRequest#getUserPrincipal and the like. The requests may be processed by, for example, doGet and doPost methods in the case of the HttpServlet. Preferably, an upper limit of heap usage is made small for non-authenticated requests, but made large or unlimited for requests that present highly reliable authentication information, such as SSL client certification authentication. Preferably, when a requestor IP address is on a blacklist, then processing is rejected. Alternatively, if there is suspicion based on the authentication information, then normal processing may be forbidden, while quarantine treatment of the request is conducted. Below, some ways of determining the reliability of a request based on authentication information will be discussed.

To summarize, some systems and methods according to the present invention may have two reliability levels: (i) authenticated; and (ii) non-authenticated. Other systems and methods according to the present invention may have three reliability levels: (i) authenticated; (ii) non-authenticated; and (iii) blacklisted. Also possible are systems and methods with more than three reliability levels. For example, a five level authentication system might include different treatment for requestors that are: (i) premium; (ii) whitelisted; (iii) authenticated; (iv) non-authenticated; and (v) blacklisted. The number of levels will generally depend on what types of meaningful inference can be rationally based on the authentication information, and how many different types of request treatment are desired.

Preferably, in the case of non-authenticated requests, quarantine treatment is conducted at first instead of normal processing. For example, the memory upper limit is made to be small and only XML parsing is performed. The outermost portion of a SOAP envelop is processed, and it is checked whether the requestor's identification information is included in the XML document. If identification information is obtained there, original processing proceeds.

When heap usage is judged to be dangerously large after processing, priority for required processing can be lowered and the requester making the troublesome request can be added to a blacklist, or other list associated with a low level of reliability. In the future, the blacklisted requestor will be identifiable by its authentication information. For example, a requestor (in the case of non-authentication, IP address and the like) who requested a large amount of heap consumption is registered in the blacklist and quarantine treatment is conducted in the following processing first. As a further example, when a large amount of heap is consumed after processing begins, processing is rejected by returning a 500 Internal Server Error or 503 Service Unavailable. Alternatively, processing can be presented such as to delay response to the request by returning a 202 Accepted, to pass to asynchronous processing, and to present URI for asynchronous processing request using a 303 See Other. As still a further example, in the case of messaging (for example, MQ), instead of a Web server, it is possible to give a low priority to the request to re-input into the queue and delay processing until the memory has an open margin, that is, when no other request comes or the number of processing threads is small.

Beyond information such as blacklists and whitelists, a servlet container preferably also stores other information that may be useful in determining reliability level and/or the nature of permitted resource access, such as: (i) a history of requestors' identification; (ii) required DRI ("Decoder Reliability Information") of recent requests; and (iii) results indicating if the request was appropriate or not. For example, a request from a requestor identification that issued an appropriate request 30 seconds ago is likely to be more appropriate than the that of a requestor requested for the first time. Thus, by using a history of authentication information in the past the decision of the above-mentioned heap limit can be improved. When an access to other DRI as a precondition is natural against an access to a certain DRI, (for example, an order is placed after checking price and stock) using authentication information, determination accuracy can be improved using their correlation. Not only simply using authentication information but using request history in the past can be used to improve and enhance the confidence in resource allocation decisions based upon the authentication information.

An example of simulation code for use in systems and methods according to the present invention will now be given (each line of code is given as a separate paragraph):

```
A class imaging a servlet container{
    // Request is processed and Response is returned.
    Response doGet(Request req) {
        Servlet servlet = Pool.getServlet( ); // Processed servlet is taken out of the pool.
        Policy policy = getPolicy( ); // Policy is obtained from servlet container.
        Principal principal = req.getPrincipal( ); // Authentication information is obtained.
        // It is judged whether memory should be limited according to the Policy.
        // Not only authentication but also a request size may be usable for material for judgement.
        long maxHeap = policy.shouldLimit(principal, req.size( );
        if (maxHeap 1 = NO_LIMIT)
servlet.setMaxHeapLimit(maxHeap);}
```

```
Response = new Response( );
try {
    servlet.doGet(req, resp); // Processing is left to servlet.
} catch(ThreadMemoryLimitExceededException e) {
    policy.addToBlackList(principal); // Added to Blacklist.
    resp = returnResponse(503_SERVICE_UNAVAILABLE);
// Service Unavailable is returned.
    }
    return resp;
    }
}
```

FIG. 1 shows a system 100 according to the present invention including: servlet container 102; policy database 104; user registry 106; and extended JVM 108. Servlet container 102 includes: servlet threads 112a,112b,112c,112d,112e; container controller 114; and policy module 116. The extended JVM 108 includes heap area (or size heap area) 110. Although policy database 104 is shown to be prepared outside the servlet container, this policy database may be included in the servlet container. User information is preserved in the user registry. Container controller 114 creates the various servlet threads 112a to 112e.

As shown by the pair of arrows to the left of the servlet threads 112, the various servlet threads receive requests and provide responses. As shown by the double arrow between servlet thread 112a and heap area 110, a servlet thread may use a portion of the shared heap area, as, for example, during object preparation. However, as shown by the arrow from servlet thread 112a that doubles back to servlet thread 112a, an exception thrown at the time of execution can deny the servlet thread use of heap 110. For example, if servlet thread 112a exceeds an upper limit, based on authentication information and its associated reliability level, for heap usage then the exception will be thrown and denied. Alternatively or additionally, the heap usage may be slowed, de-prioritized or quarantined, or otherwise controlled, again based on authentication information and its associated reliability level.

FIG. 2 shows a method 200 of controlling resource allocation based on authentication of a requester. Method 200 includes steps S202, S204, S206 and S208. It is highly preferable that the requester be allocated limited or no access to the controlled resources prior to step S206 to avoid harm and/or adverse consequences to the software platform.

FIG. 3 shows a computer readable medium system 300 according to the present invention, including: container controller module 304; policy module 306 and stored list of reliability levels 308. Although system 300 includes a simple medium 302, it is noted that multiple mediums may be used (and can still be considered as a "medium" as that term is used herein). The various modules 304, 306, 308 may or may not be split up over physically separate multiple mediums, when multiple physically separate mediums are used. When multiple physically separate mediums are used as a computer readable medium according to the present invention, the multiple mediums may or may not be: (i) geographically remote from each other; and or (ii) the same type of medium (for example, disk drive, flash drive).

Container controller module 304 receives requests from requesters and determines authentication information for each request.

Policy module 306 sets reliability levels from among a set of possible reliability levels based on the authentication information.

Stored list of reliability levels 308 stores the set of reliability levels used by the policy modules in setting a reliability level for each requester.

DEFINITIONS

The following definitions are provided to facilitate claim interpretation:

Present invention: means at least some embodiments of the present invention; references to various feature(s) of the "present invention" throughout this document do not mean that all claimed embodiments or methods include the referenced feature(s).

First, second, third, etc. ("ordinals"): Unless otherwise noted, ordinals only serve to distinguish or identify (e.g., various members of a group); the mere use of ordinals implies neither a consecutive numerical limit nor a serial limitation.

software platform: includes, but is not limited to, VMs, JVMs, webservers, messaging systems and/or MQ.

authentication: includes any for of authenticating whether or not a particular person and/or a particular piece of computer hardware is positively and fully identified.

requester: includes human requesters as well as non-human requesters, such as artificial intelligence requesters.

resource intensive request: any request that, if performed, would request more of a resource than a system is designed to handle, regardless of: (i) the actual amount of resource use; (ii) the type of resource used (for example, computing power, memory); and/or (iii) the subjective motivations (for example, malice, carelessness) of the requester.

reliability level: any set of resource allocation limits and/or permissions based, at least in part, upon authentication.

setting a limit/setting an upper limit: includes setting: a zero limit, a finite limit and/or an "unlimited" limit.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the above definitions shall control. If the definitions provided above are broader than the ordinary, plain, and accustomed meanings in some aspect, then the above definitions shall be considered to broaden the claim accordingly.

To the extent that a patentee may act as its own lexicographer under applicable law, it is hereby further directed that all words appearing in the claims section, except for the above-defined words, shall take on their ordinary, plain, and accustomed meanings (as generally shown by documents such as dictionaries and/or technical lexicons), and shall not be considered to be specially defined in this specification. In the situation where a word or term used in the claims has more than one alternative ordinary, plain and accustomed meaning, the broadest definition that is consistent with technological feasibility and not directly inconsistent with the specification shall control.

Unless otherwise explicitly provided in the claim language, steps in method steps or process claims need only be performed in the same time order as the order the steps are recited in the claim only to the extent that impossibility or extreme feasibility problems dictate that the recited step order (or portion of the recited step order) be used. This broad interpretation with respect to step order is to be used regardless of whether the alternative time ordering(s) of the claimed steps is particularly mentioned or discussed in this document.

What is claimed is:

1. A method of using a software platform, the method comprising the steps of:

receiving a request from a requestor;

determining authentication information in the received request;

setting a reliability level from among a plurality of reliability levels based on the authentication information determined in the determining step;

after the setting step, controlling a resource allocation allowed in a response to the request as controlled by the software platform based on the reliability level set at the setting step;

creating a thread in response to the received request; and associating the thread with the reliability level set at the setting step;

wherein:

the controlling step has begun to be performed before the thread can cause any use of the heap;

the software platform is a Virtual Machine (VM) including a heap memory; and the control of the controlling step includes an upper limit on heap usage based on the reliability level set at the setting step.

2. A software platform system comprising:

a first resource;

a container controller module structured and/or programmed to receive a request from a requestor and to determine authentication information in the request; and a policy module structured and/or programmed to set a reliability level from among a plurality of reliability levels based on the authentication information;

wherein:

the container controller module is further structured and/or programmed to at least partially control resource allocation of the first resource in a response to the request based on the reliability level;

the software platform system is a Virtual Machine (VM);

the first resource is a heap memory;

the container controller module is further structured and/or programmed to set an upper limit on heap usage based on the reliability level; and the container controller module is further structured and/or programmed to create a thread in response to the request and to associate the thread with the reliability level and to begin controlling resource allocation to the heap by the thread before any use of the heap by the thread.

* * * * *